United States Patent [19]
Dilbert

[11] 4,315,902
[45] Feb. 16, 1982

[54] METHOD FOR PRODUCING CARBON BLACK

[75] Inventor: Meredith N. Dilbert, Bartlesville, Okla.

[73] Assignee: Phillips Petroleum Company, Bartlesville, Okla.

[21] Appl. No.: 119,269

[22] Filed: Feb. 7, 1980

[51] Int. Cl.³ .................. C01B 31/02; C09C 1/48
[52] U.S. Cl. ............................ 423/456; 423/450; 422/150
[58] Field of Search ............ 423/450, 456, 455; 422/150

[56] References Cited
U.S. PATENT DOCUMENTS

| | | | |
|---|---|---|---|
| 3,009,784 | 11/1961 | Krejci | 23/209.4 |
| 3,222,136 | 12/1965 | Hess et al. | 23/259.5 |
| 3,484,200 | 12/1969 | Johnson et al. | 23/209.5 |
| 3,490,869 | 1/1970 | Heller | 423/456 |
| 3,663,172 | 5/1972 | Foster-Pegg | 23/209.4 |
| 3,725,103 | 4/1973 | Jordan et al. | 106/307 |
| 4,138,217 | 2/1974 | Slagel et al. | 422/151 |

Primary Examiner—O. R. Vertiz
Assistant Examiner—Gregory A. Heller

[57] ABSTRACT

Carbon black is produced in a process comprising prequenching with hollow cone prequench having an included angle effective to produce high tint residual carbon black. Iodine number and tint strength number are changed by changing the included angle of the prequench.

7 Claims, 2 Drawing Figures

METHOD FOR PRODUCING CARBON BLACK

FIELD OF THE INVENTION

The invention relates to carbon black. In one aspect, the invention relates to method and apparatus for changing the tint strength number of carbon black and the iodine number of carbon black. In other aspects, the invention relates to method and apparatus for producing carbon black having a high tint residual.

BACKGROUND OF THE INVENTION

Most carbon blacks are currently produced by furnace processes in which a feed-stock hydrocarbon is thermally decomposed in the presence of hot gases produced by combustion of fuel. A carbon black-containing aerosol results in which the carbon black is suspended in the hot combustion gases and the other gaseous products which result from the thermal decomposition of the feedstock. The resultant aerosol is then prequenched or cooled to stop the carbon black forming reaction, often at least partially with water, prior to passage into a collection system for further quenching and recovery of the carbon black.

The interval between the introduction of the feedstock into the hot combustion gases and the prequenching is critical to the nature of the carbon black products and the nature of the carbon black products is thought to confer different properties upon the materials with which the product carbon black is compounded.

The interest in the nature and character of the carbon black product resulted in the development of numerous tests to characterize the carbon black. Some of these tests have developed as ASTM standards. These include such tests as: Dibutyl Phthalate Absorption Number of Compressed Sample (ASTM D 3493-76), hereinafter referred to as 24M4DBP; Dibutyl Phthalate Absorption Number (ASTM D 2414-76), hereinafter referred to as DBP; Surface Area (ASTM D 3037-76), hereinafter referred to as N₂SA; Toluene Discoloration (ASTM D 1618-75), hereinafter referred to as Photelometer; Iodine Adsorption Number (ASTM D 1510-76), hereinafter to as I₂ No.; Tint Strength (ASTM D 3265-76), hereinafter referred to as Tint; and CTAB (ASTM D 3765-79), hereinafter referred to as CTAB.

Other tests have not developed into ASTM standards but are performed according to test procedures established by manufacturers and users of carbon black. These tests include such tests as "Cabot" Tint Factor, "Cabot" Iodine surface area, and the like, such as described, for example, in U.S. Pat. Nos.: 3,725,103; 3,799,788; 3,830,774; 3,864,305; 3,973,983; and 4,035,336.

Carbon black has been characterized by its optical properties, such as reflectance or absorbance of light, since before the furnace process became widely used; and in recent years a revival of interest in optical characterization has occurred. Particularly popular in recent years has been the tint strength test performed according to ASTM D 3265-76. In this test, the decrease in reflectance of a white pigment as a result of addition of carbon black is recorded. It can now be stated firmly that measuring the surface reflectance of a paste of carbon black in this manner provides a relative measure of average optical size, which is a function of the total morphology of the carbon black being measured.

Total morphology, however, embraces a number of factors. As is well known from morphology studies, carbon black entities consist of basic or ultimate particles known as nodules which are fused together into structural aggregates of varying size and configuration. Total morphology of the carbon black therefore embraces a number of factors: nodule size, shape, the degree of structuring (hereinafter referred to as "structure"), and breadth of distributions of all these factors. This latter distribution factor, which cannot be measured routinely, is lumped into a property referred to as "distribution" or "aggregate size distribution".

Tint strength, as measured by ASTM D 3265-76, increases with surface area, decreases with increasing structure, and increases as breadth of distribution narrows. So high tint strength does not necessarily mean high surface area (and therefore high "quality", as is commonly believed). It means high surface area only if such factors as structure and breadth of distribution are held constant. In recent years, however, it has been learned to vary structure over quite a range, and therefore if surface area and breadth of distribution are held constant while reducing structure, the resulting "high tint strength" carbon black could be poorer quality, at least so far as road wear is concerned.

It can thus be seen that the tint strength test by itself suffers shortcomings in that it measures and is sensitive to a combination of at least three basic factors of carbon black. A tint strength number, by itself, can thus be misleading unless accompanied by other information, specifically a measure of nonporous surface area and an accurate measure of structure. These other characteristics can be provided by ASTM tests: CTAB (ASTM D 3765-79); N₂SA (ASTM D 3037-76); and 24M4DBP (ASTM D 3493-76).

The concept of tint residual came about as a result of an effort to make tint strength according to ASTM D 3265-76 supply information about distribution. Since tint strength is basically determined by the variables of surface area, structure, and breadth of distribution, a regression analysis was performed on a number of carbon blacks in terms of surface area and structure alone. The neglected variable, breadth of distribution, then appeared as deviations from the regression line or "residuals" (hereinafter referred to as "tint residual"), i.e., $$\text{tint residual} = \text{Tint}_{ASTM} - \text{Tint}_{MODEL}$$

where
$\text{Tint}_{MODEL} = 56 + 1.067 S_c - 0.00275 S_c^2 - 0.25 \cdot 96A - 0.201(S_n - S_c)$;
$S_c$ = Specific Surface Area (CTAB) (as measured by ASTM D 3765-79), m²/g;
$S_N$ = Specific Surface Area (N₂SA) (as measured by ASTM D 3037-76), m²/g;
A = 2 (as measured by ASTM D 3493-76), cm³/100 g; and
$\text{Tint}_{ASTM}$ = tint strength (as measured by ASTM D 3265-76).

Tint residual shows good correlation with polydispersity estimates from electron microscopy and graduated ultrafiltration tests. A positive tint residual indicates a carbon black narrower in distribution and a negative tint residual indicates a carbon black broader in distribution than the average breadth of the blacks used in the development of $\text{Tint}_{MODEL}$. It is important to note that tint residual is defined in terms of standard ASTM procedures rendering the test widely usable.

Further, tint residual has been found to correlate well with such compounded properties of carbon black as heat build-up, resilience, and dynamic wire cord adhesion. Negative tint residuals correlate with blacks having broad distribution, low heat build-up, good resilience, and good dynamic wire cord adhesion. Nevertheless it is known that high positive tint residuals give better yields and theoretically better skid and traction. Accordingly, there is considerable demand for such high positive tint residual carbon blacks and methods and apparatus for producing such high positive tint residual carbon blacks are desirable. Such narrow distribution blacks are disclosed, for example, in U.S. Pat. No. 3,725,103.

By control of the conditions prevailing between time of introduction of the feedstock into the hot combustion gases and the manner and time of quenching to below carbon black forming temperatures, it is possible to control some of the factors or characteristics of the product carbon black. Because certain carbon blacks having certain characteristics, for example, iodine number determined according to ASTM D 1510-76, and tint strength number according to ASTM D 3265-76 are required for certain applications, it is desirable to have a method and apparatus for producing carbon black which provides means for changing or varying these characteristics to meet the required specifications. Since iodine number is inversely related and tint strength is directly related to "Cabot" tint factor, as disclosed, for example, in U.S. Pat. No. 3,725,103, it is particularly desirable to have a method whereby iodine number can be decreased and tint strength can be increased in order to facilitate production of such high Cabot tint factor carbon blacks as are disclosed in U.S. Pat. No. 3,725,103.

Accordingly, an object of the present invention is method and apparatus for producing carbon black having a narrow distribution. A further object is method and apparatus for varying the distribution of carbon blacks. A further object is method and apparatus for producing carbon blacks having a tint residual of +7 or greater. Yet another object is a method and apparatus for changing certain characteristics of carbon black such as iodine number and tint strength. Yet other objects and advantages will become apparent to one of ordinary skill in the art from the following disclosure and the claims.

SUMMARY OF THE INVENTION

I have discovered, and upon this discovery my invention is predicated, that in a carbon black producing process for the production of "hard" carbon blacks, that iodine number and tint strength number can be varied by changing the included angle of hollow cone prequench fluid sprayed into a reacting mixture of carbon black. I have further discovered that a high tint residual carbon black having a tint residual of +7 or greater can be produced by an apparatus and method wherein a reacting mixture comprising feed hydrocarbon and combustion gases is prequenched by a hollow cone quench spray pattern having an included angle effective to produce such a high tint residual carbon black.

In one aspect, my invention broadly comprises, in a process in which carbon black is produced having a first iodine number determined according to ASTM D 1510-76 and a first tint strength number determined by ASTM D 3265-76, said process comprising introducing combustion fuel and air into a precombustion zone, combusting the thus introduced fuel and air to produce hot combustion gases, introducing feed hydrocarbon into the hot combustion gases to produce a reacting mixture, flowing the reacting mixture along a flow axis of means defining a flow path, and quenching the reacting mixture by introducing a quench fluid in a generally diverging hollow cone spray pattern having a first included angle generally coaxially with the flow axis into flowing reacting mixture, a method for changing the first iodine number in a first direction to a second iodine number and for changing the first tint strength number in a second direction to a second tint strength number by changing the first included angle in said second direction to a second included angle.

In another aspect, my invention broadly comprises apparatus and method for producing a positive tint residual carbon black of about 7 or more. The apparatus comprises a carbon black reactor having an upstream end and a downstream outlet. Means defining a flow path connects the upstream end in flow communication with the downstream outlet. The means defining a flow path comprises a precombustion chamber having an upstream end and a downstream opening. Feed inlet means is operable for introducing feed hydrocarbon into the means defining the flow path. Air and fuel inlet means are operable for introducing air and fuel into the precombustion zone for production of hot combustion gases. Axial prequench inlet means is operable for generally axially introducing quench fluid into the means defining a flow path in a diverging generally hollow cone pattern generally coaxially with a longitudinal axis of the means defining a flow path and having an included angle effective to produce positive tint residual carbon black of 7 or greater. In one broad aspect, the included angle is in the range of at least about 120 to about 170 degrees.

My method for producing a high positive tint residual carbon black comprises introducing air and fuel into the precombustion zone of a carbon black reactor, combusting the air and fuel to produce swirling hot combustion gases, introducing feed hydrocarbon into the means defining a flow path, pyrolyzing the introduced feed hydrocarbon in the hot combustion gases to form a reacting mixture, flowing the reacting mixture along a flow axis of the means defining a flow path from the upstream end to the downstream outlet, and generally axially introducing prequench fluid into the thus flowing reacting mixture in a diverging hollow cone pattern generally coaxially with the flow axis at an included angle effective to produce a positive tint residual carbon black having a tint residual of 7 or more before the thus flowing reacting mixture reaches the downstream outlet. In one broad aspect of my invention, the included angle is about 120 to about 170 degrees.

DETAILED DESCRIPTION OF THE INVENTION

Figure 1:
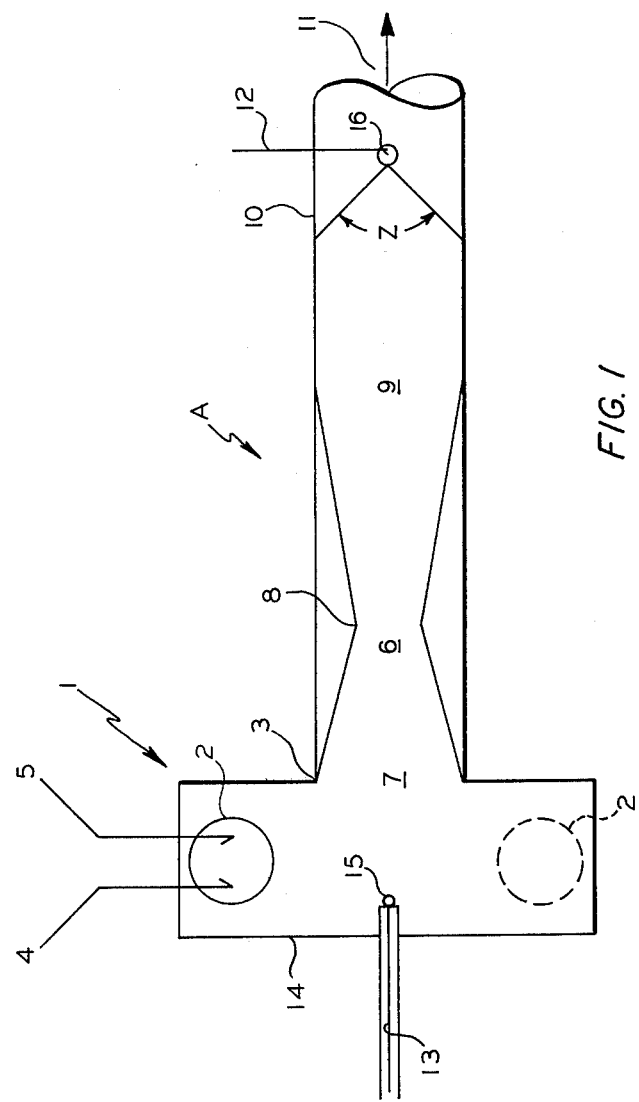
FIG. 1 shows schematically one embodiment of a carbon black reactor in accordance with the invention.

FIG. 1 shows a schematic diagram of a carbon black reactor A in accordance with the present invention. The carbon black reactor comprises a precombustion chamber 1 having an upstream end 14 and a downstream opening 3. The precombustion chamber 1 has tangential inlet ports 2 for introduction of combustion air 4 and fuel 5 thereinto. The downstream opening 3 is adjacent to and continuous with the upstream opening 7 of a converging-diverging venturi 6 which has a throat 8 and a downstream opening 9. The downstream opening 9 of the venturi 6 is adjacent to and continuous with the upstream opening of a breeching chamber 10 which has a downstream outlet 11. Prequench fluid is introduced into the breaching chamber 10 via axial prequench inlet means 12 having nozzle 16. Preferably, prequench inlet means 12 is a hollow cone wide angle nozzle having an included angle Z. Feed hydrocarbon inlet means 13 introduces feed hydrocarbon via nozzle 15 into precombustion chamber 1 in a generally axial direction through upstream end 14 of the precombustion zone.

Figure 2:
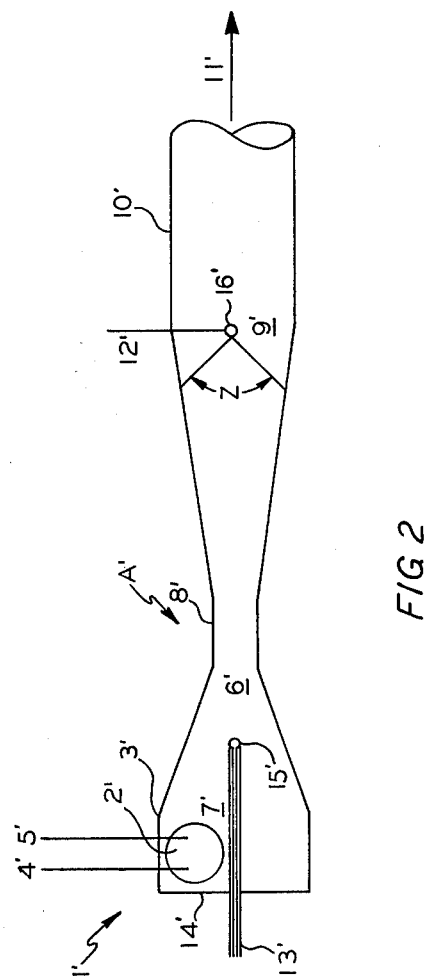
FIG. 2 shows schematically another embodiment of a carbon black reactor in accordance with the invention.

FIG. 2 shows an alternative embodiment of the present invention in which the venturi 6' is a long throat venturi. FIG. 2 also shows that the feed hydrocarbon inlet means 13' can be positioned so that feed is introduced into the converging portion of the venturi and that the prequench inlet means 12' can be positioned to spray quench fluid into the diverging portion of the venturi.

Carbon black reactor A can be a carbon black reactor suitable for making hard or "tread" blacks, such as, for example, ASTM types N220, N234, N339, N375, and the like. Preferably the reactor is a vortex flow carbon black reactor having a precombustion chamber. The precombustion chamber 1 can be any precombustion chamber operable for combustion of fuel and gas to produce a vortex flow of hot combustion gases. The precombustion chamber can be, for example, an enlarged precombustion chamber as shown schematically in FIG. 1 and such as that described in U.S. Pat. No. 2,564,700 and known in the art. Alternatively, the precombustion chamber can be a precombustion chamber as shown in FIG. 2, which is not enlarged. The precombustion chamber can be generally cylindrical. When practicing the aspect of my invention relating broadly to changing iodine number and tint strength by changing prequench angle, the precombustion zone can have a length broadly in the range of about 6 to 24 inches, more preferably in the range of about 8 to 24 inches, and a diameter in the range of about 20 to 40 inches or greater, more preferably about 24 to about 39 inches. When used in accordance with the aspect of my invention can have a diameter in the range of about 20 to about 40 inches or greater, more preferably in the range of about 24 to about 39 inches and a length along a longitudinal axis of about 6 to about 16 inches, more preferably in the range of about 8-14 inches. Preferably the precombustion chamber 1 has tangential inlet ports 2 for introduction of combustion air 4 and fuel 5 to produce a generally tangential vortex flow of hot combustion gases.

The precombustion chamber 1 has an upstream end 2 and a downstream opening 3. Feed hydrocarbon inlet means 13 with nozzle means 15 which passes axially through the first end 14 for introduction of feed hydrocarbon into the precombustion chamber can be any suitable inlet nozzle means 15 such as, for example, hollow cone nozzles, solid cone nozzles, fog jet nozzles, and other suitable nozzles for introducing feed hydrocarbon into carbon black reactors. Means 15 can include bifluid or atomizing nozzles and the like. Preferably, for making high tint residual carbon black, feed inlet nozzle 15' is a solid cone nozzle having a 20-40 degree spraying angle. A suitable nozzle is such as, for example, Full-Jet ® Nozzles 30° Injector type, such as Model 3014, available from Spraying Systems Co., Bellwood, Ill. 60104.

The precombustion chamber 1 has a downstream opening continuous with a means defining a flow path for practicing that aspect of my invention wherein iodine number and tint strength number are changed by changing prequench angle, the means defining a flow path can be a straight tube or can comprise a venturi 6 or a venturi followed by a smoke pipe breeching chamber 10. The venturi can broadly be any venturi suitable for use in production of hard carbon blacks. The venturi can be broadly a venturi having an upstream opening 7 having an upstream diameter in the range of about 10 to about 40 inches. For the production of carbon blacks of such as the ASTM N220 or ASTM N339 types, the upstream diameter can more preferably be in the range of about 12 to about 40 inches, most preferably about 15 inches. For practicing that aspect of my invention wherein a positive tint residual black is produced, the upstream diameter can be broadly, as stated above, in the range of about 10 to about 40 inches, more preferably from about 20 to about 30 inches, most preferably about 24 inches.

The length of the converging portion of the venturi can be broadly from about 10 to about 50 inches. For production of carbon blacks such as the ASTM N220 or ASTM N339 types, the range can more preferably be in the range of about 10 to about 30 inches, most preferably in the range of about 12 to about 15 inches. In practicing that aspect of my invention wherein a positive tint residual carbon black of +7 or greater is utilized, the length can more preferably be in the range of about 20 to about 30 inches, more preferably about 26 inches.

The throat 8 of the venturi 6 can have a diameter broadly in the range of about 6 to about 10 inches, more preferably about 7 to about 9 inches. In practicing the aspect of my invention wherein a positive tint residual carbon black of 7 or greater is produced, the throat diameter is most preferably about 7 inches. The larger throat diameters can be used but the flow rate through the carbon black reactor would have to be correspondingly increased.

The throat 8 of the venturi 6 can have a length broadly in the range of about 0 to about 10 inches. In practicing the aspect of my invention wherein a positive tint residual carbon black of 7 or greater is produced, the throat length is more preferably in the range of about 5 to about 9 inches, most preferably about 7 inches.

The diverging portion of the venturi 6 can have a length broadly in the range from about 10 to about 90 inches. For making carbon blacks of ASTM types N220 and N339, the length can be more preferably in the range of about 10 to about 20 inches. For making positive tint residual carbon blacks in accordance with my invention, the length can be more preferably in the range of about 30 to about 70 inches, most preferably in the range of about 50 to about 60 inches.

The downstream opening of venturi 6 can have a downstream diameter broadly in the range of about 10 to about 40 inches, more preferably in the range from about 10 to about 25 inches, most preferably about 15 inches.

The injection distance is defined herein as the distance from the upstream end 14 of the precombustion chamber at which the feed hydrocarbon means 13 is positioned for introducing feed hydrocarbon into the carbon black reactor A. The injection distance can broadly be between about 0 and about 66 inches to practice that aspect of my invention dealing with changing carbon black characteristics by changing spray angle. For production of positive tint residual carbon blacks of +7 or greater, the injection distance is preferably introduced into carbon black reactor A with the converging portion of venturi 6. Broadly the injection distance can be from about 6 to about 66 inches, more preferably about 20 to about 40 inches, most preferably about 28 to about 30 inches for production of positive tint residual carbon black.

The means defining a flow path can further comprise a smoke pipe or breeching chamber 10 as known in the art having a diameter approximately equal to the downstream diameter of the venturi 6 at downstream opening 9.

Prequench inlet means 12 is operable for introducing prequench fluid axially into at least one of the diverging portion of the venturi and the breeching chamber. The prequench fluid can be any suitable prequench fluid such as water.

The prequench inlet means 12 is positioned at a prequench distance measured from the upstream end of the precombustion chamber in the range of between about 20 and about 160 inches, more preferably in the range of about 30 to about 80 inches, most preferably in the range of about 45 to about 75 inches.

The prequench nozzle 15 can be a hollow cone nozzle having an included angle Z. Preferably included angle Z can be for the production of positive tint residual carbon black of 7 or greater in the range of about 120 to about 170 degrees, more preferably in the range of about 150 to about 170, most preferably in the range of about 155 to about 160 degrees. Suitable nozzles can be: Parasol ® Nozzles Extra Wide Spray, Whirljet ® Nozzles Wide Spray, and the like. Specific examples of suitable nozzles are shown in Table I.

TABLE I

| Nozzle | Angle | Source |
|---|---|---|
| Whirljet(R) Nozzle A-10 | 75 | All available from |
| Whirljet(R) Nozzle A-10-15-W | 120 | Spraying Systems Co. |
| Parasol(R) Nozzle E-10 | 157 | Bellwood, Ill. 60104 |

In accordance with the present invention, a method is provided for producing a carbon black product having a positive tint residual of +7 or greater. In practicing the method, combustion air and fuel are introduced generally tangentially into a precombustion zone of a carbon black reactor and combusted therein to produce swirling hot combustion gases. Axial air and feed hydrocarbon are introduced axially into the swirling combustion gases to form a reacting mixture. The oil inlet nozzle is positioned to introduce feed hydrocarbon into the combustion gases in the means defining a swirling flow path at an injection distance as set forth above.

The reacting mixture is then flowed through the downstream opening of the precombustion zone into the means defining a flow path comprising a converging-diverging venturi and optionally thence into the breeching chamber along a flow axis of the means defining a flow path.

Quench fluid is sprayed in a generally hollow diverging conical pattern having an included angle as set forth above in a direction generally coaxial with the flow axis. Preferably the quench fluid is directed in a generally upstream direction. The quench is introduced into the breeching chamber at a position having a distance from the upstream end of the precombustion chamber in the range set forth above.

The feed hydrocarbon can be any suitable feed hydrocarbon for carbon black making. For example, the feed hydrocarbon can be any hydrocarbon having a BMCI in the range of 100 to 140, preferably in the range of about 115 to about 125. The structure of the resulting carbon black can be controlled by adding potassium to decrease structure or by introducing axial air to increase structure, as is known in the art.

Tangential air and fuel are introduced into the precombustion zone through tangential inlet ports. Preferably the air and/or tangential fuel is preheated. For example the air can be preheated to a temperature in the range of from about 300 to about 1200 degrees, more preferably in the range from about 600 to about 1200 degrees, since higher temperatures decrease the amount of fuel required. The combustion fuel can be any suitable fuel for combustion with air to produce hot combustion gases. For example the combustion fuel can be such as natural gas having a Btu value of about 1000 Btu/SCF, or any other gaseous fuel or liquid fuel, including a portion of the feedstock, can be used as fuel. The fuel can be preheated as known in the art if desired.

Tangential air/oil ratio is not considered critical to the practice of my invention but can be selected to produce the type of carbon black desired as is known in the art. For example, for the manufacture of such as ASTM N220 carbon black, an air/oil ratio broadly in the range of about 590 to about 650 SCF of air per gallon of oil (SCF/gal); for the manufacture of ASTM N339 carbon black, the air/oil ratio can be broadly in the range of about 500 to about 550 SCF of air/gallon of oil (SCF/gal); and for the manufacture of high tint residual ASTM N234 carbon black the air/oil ratio can be broadly in the range of about 700 to about 750 SCF/gal.

In accordance with another aspect of my invention a method is provided to change iodine number in a first direction and tinting strength in a second direction opposite to the first direction by changing the included angle of the quench spray in the second direction. To change the iodine number by a number in the range from about 1 to about 2 units, a change in the included angle of about 10 to about 20 degrees is required, more preferably about 10 degrees. An increase in included angle decreases iodine number, and a decrease in included angle increases iodine number. To change tint strength by about 1 unit a change in the included angle of about 15 to 40 degrees is required. Tint strength increases as the included angle is increased and decreases as the included angle is decreased. To further illustrate my invention, the following example is provided.

EXAMPLE I

Carbon black was produced having the characteristics and under the conditions summarized in Table II. Runs 1 through 4 were produced in a carbon black reactor having the configuration schematically illustrated in FIG. 1. Run 5 was produced in a carbon black reactor having the configuration schematically illustrated in FIG. 2.

TABLE II

| Reactor Conditions: | N 220 Furnace Black 1 | N 220 Furnace Black 2 | N 339 Furnace Black 3 | N 339 Furnace Black 4 | N 234 Furnace Black 5 |
|---|---|---|---|---|---|
| Axial Air, SCF/hr., (1) | 6,011 | 5,998 | 6,141 | 6,010 | 2,800 |
| Tangential Air: | | | | | |
| SCF/hr., | 197,586 | 198,840 | 197,265 | 198,265 | 205,880 |
| Air Temp., °F., | 1,042 | 1,059 | 1,178 | 1,177 | 797 |
| Tangential Gas: | | | | | |
| SCF/hr. (About 1000 Btu/SCF) | 12,756 | 12,606 | 11,969 | 12,237 | 13,605 |
| Axial Feed Oil | (2) | (2) | (2) | (2) | (3) |
| Gallons/hr. | 321.44 | 341.47 | 385.16 | 392.49 | 285 |
| Nozzle Pressure, psig. | 71 | 83 | 98 | 104 | 121 |
| Oil Temperature, °F. | 405 | 399 | 390 | 397 | 295 |
| Boiling Range, °F. | 550 to 1050 | (Same as Run 1) | (Same as Run 1) | (Same as Run 1) | (Same as Run 1) |
| API at 60° F. | 1 | | | | |
| BMCI, | 125 | | | | |
| Potassium (K+) ppm by wt. of Oil[a] | 0.9 | 0.9 | 0.9 | 0.9 | 0.9 |
| Prequench Water: | | | | | |
| Spray Pressure, psig. | 140 | 110 | 70 | 80 | 170 |
| Gallons/hr., at 100° F. | 158.7 | 158.1 | 121.2 | 118.9 | 363 |
| Nozzle Used (See Table I) | A-10 | A-10-15W | A-10-15W | E-10 | E-10 |
| Spray Angle | 75° | 120° | 120° | 157° | 157° |
| Type of Spray | Hollow Cone | Hollow Cone | Hollow Cone | Hollow Cone | Hollow Cone |
| Prequench distance from upstream end of precombustion chamber, inches | 60 | 60 | 60 | 60 | 69 |
| Final Quench Water: | | | | | |
| Gallons/hr. | 466.6 | 474.7 | 487.9 | 450.7 | 310 |
| Quench distance from outlet of precombustion chamber, inches | 134 | 134 | 134 | 134 | — |
| Reactor Pressure, psig. | 2.03 | 1.98 | 2.14 | 2.18 | 3.80 |
| Carbon Black Properties: | | | | | |
| 24M4 DBP, cc/100 gm.[b] | — | — | — | — | (95.2) |
| $N_2Sa$, m²/gm.[c] | — | — | — | — | (121.3) |
| CTAB, m²/gm.[d] | — | — | — | — | (120.0) |
| Photelometer,[e] | — | — | — | — | — |
| Iodine Number, mgm $I_2$/gm[f] | 129 | 125 | 105 | 103 | (114) 133 |
| Tint Strength,[g] | 112.7 | 115.4 | 109.6 | 110.6 | (125.2) 124 |
| DBP, cc/100 gm[h] | — | — | — | — | (123.6) 134.5 |
| Cabot Iodine No.,[i] | — | — | — | — | (93.9) |
| Cabot Tint[j] | 234.4 | 240.0 | 228.0 | 230.0 | (260.4) |
| Tint Factor (Cabot)[k] | — | — | — | — | (325.1) |
| Tint Residual[l] | — | — | — | — | +7 |

Note:
Properties above are generally on Carbon Black from Reactor. Properties of product carbon black after filtering and other processing are shown enclosed in parentheses. A dash indicates that a test was not run. Test procedures are footnoted. (1) indicates that axial air surrounds oil nozzle means 13, 15, and 13', 15'; (2) indicates that nozzle 15 is at upstream end 14 of precombustion zone 1; and (3) indicates that nozzle 15' is at 8 inches upstream from inlet to venturi throat 8'.

[a] Aqueous $KNO_3$ added to the feed oil, 2 wt. % $KNO_3$ in water.
[b] ASTM D 3943-76.
[c] ASTM D 3037-76.
[d] ASTM D 3765-79.
[e] ASTM 1618-75.
[f] ASTM 1510-76.
[g] ASTM D 3265-76.
[h] ASTM D 2414-76.
[i] Cabot Iodine No. according to U.S. 3,725,103.
[j] Cabot Tint = 2.08 × Tint Strength according to ASTM D 3265-76.
[k] Cabot Tint Factor according to U.S. 3,725,103.
[l] Calculated as hereinabove described.

Table III shows the relevant dimensions of the carbon black reactors used in making runs 1–5.

TABLE III

| | Runs 1-4 | Run 5 |
|---|---|---|
| Precombustion chamber | | |
| Diameter, inches | 39 | 24 |
| Length, inches | 12 | 12 |
| Venturi | | |
| Converging inlet diameter, inches | 15 | 24 |
| Converging length, inches | 13.5 | 25⅝ |
| Throat diameter, inches | 8 | 7 |
| Throat length, inches | 0 | 7 |
| Diverging outlet diameter, inches | 15 | 15 |
| Diverging length, inches | 16.3 | 57½ |

A comparison of runs 1 and 2 in the making of ASTM N220 carbon black shows that an increase in the included angle of the quench spray of 45° caused an increase in tint strength number of 2.7 and a decrease in the iodine number of 4. The comparison of runs 3 and 4 in the making of ASTM N339 carbon black shows that an increase in the included angle of the quench spray of 37° caused an increase of 1 unit in the tinting strength number and a decrease of 2 units in the iodine number.

Table II shows for run 5 the conditions under which an ASTM N234 type carbon black having a positive tint residual of about 7 or more can be made.

The invention has been described in terms of a preferred embodiment and an operating example has been provided to further exemplify the invention. However the invention is not limited thereby, but by the claims appended hereto.

I claim:

1. A method for producing carbon black having a tint residual of 7 or greater in an apparatus comprising:
   an upstream end;
   a downstream outlet;
   means defining a flow path connecting the upstream end in flow communication with the downstream outlet, said means comprising a precombustion chamber having an upstream end comprising the upstream end of the carbon black reactor, and a downstream opening;
   feed inlet means for introducing a hydrocarbon feed into the means defining a flow path at an injection distance measured from the downstream opening of the precombustion chamber;
   air and fuel tangential inlet means for introducing air and fuel generally tangentially into the precombustion chamber;
   axial prequench inlet means for introducing prequench fluid into the means defining a flow path in a generally conical hollow diverging pattern generally coaxially with a longitudinal axis of the means defining a flow path and in an upstream direction having an included angle effective to produce a positive tint residual black having a positive tint residual of 7 or greater;
   said method comprising:
   introducing air and fuel tangentially into the precombustion chamber;
   reacting the thus tangentially introduced air and fuel to produce swirling combustion gases;
   introducing a feed hydrocarbon into the combustion gases in the means defining a flow path at said injection distance;
   reacting the thus introduced feed hydrocarbon with the combustion gases to produce a reacting mixture;
   flowing the thus produced reacting mixture along a flow axis of the means defining a flow path from the upstream end of the precombustion zone to a downstream outlet;
   quenching the reacting mixture by spraying a prequench fluid by said prequench means into the reacting mixture in a generally axial upstream direction, said prequench fluid being sprayed in a generally conically diverging hollow spray pattern.

2. A method as in claim 1 wherein:
   the tangential air and fuel is introduced into the precombustion zone having an air/fuel ratio in the range of about 700 SCF/gal to about 750 SCF/gal.

3. A process as in claim 2 which is carried out in a carbon black reactor wherein:
   the precombustion chamber has a diameter in the range of about 24 to about 39 inches and a length in the range of about 8 to about 24 inches, and a downstream opening said downstream opening having a diameter of about 15 inches; and means defining a flow path further comprises:
   a converging-diverging venturi having an upstream opening continuous with the downstream opening of the precombustion chamber, said upstream opening having a diameter of about 15 inches, a converging portion having a length in the range of about 12 to about 15 inches, a throat having a diameter in the range of about 7 to about 9 inches, and a length in the range of about 0 to about 10 inches, the diverging portion having a length in the range of about 10 to about 20 inches, and a downstream opening having a diameter of about 15 inches;
   a breeching chamber having an upstream opening continuous with the downstream opening of the venturi and having approximately the same diameter; and
   said prequench inlet means is positioned at a distance from the downstream opening of the precombustion chamber in the range of about 45 to abut 60 inches to introduce the prequench fluid into at least one of the venturi and the breeching chamber.

4. A process as in claim 3 wherein:
   the prequench inlet means is oriented to introduce the prequench fluid in a generally upstream direction; and the prequench fluid is water.

5. A method for making high tint residual carbon black having a tint residual of 7 or greater comprising:
   introducing air and fuel tangentially into a precombustion zone;
   reacting the thus tangentially introduced air and fuel to produce swirling combustion gases;
   introducing a feed hydrocarbon into the combustion gases;
   reacting the thus introduced feed hydrocarbon with the combustion gases to produce a reacting mixture;
   flowing the reacting mixture of feed hydrocarbon and hot combustion gases along a flow axis; and
   prequenching the thus flowed reaction mixture with a diverging hollow cone spray of prequench fluid having an angle effective to make high tint residual carbon black wherein said prequench fluid is sprayed in an upstream direction generally coaxially with the flow axis in a generally conically diverging hollow spray pattern and has an included angle in the range of about 120 to about 170 degree to produce a carbon black hairing a tint resdual of 7 or greater.

6. A method as in claim 5 wherein:
   the included angle is in the range of about 150 to about 170 degrees.

7. A method as in claim 5 wherein:
   the included angle is in the range of about 155 to about 160 degrees.

* * * * *